US008745394B1

(12) United States Patent
Rahat et al.

(10) Patent No.: US 8,745,394 B1
(45) Date of Patent: Jun. 3, 2014

(54) METHODS AND SYSTEMS FOR SECURE ELECTRONIC COMMUNICATION

(71) Applicant: Citibank, N.A., New York, NY (US)

(72) Inventors: Syed Rahat, Mason, OH (US); Wayne Browning, Loveland, OH (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 13/973,173

(22) Filed: Aug. 22, 2013

(51) Int. Cl.
*H04L 29/06* (2006.01)
*H04L 9/32* (2006.01)

(52) U.S. Cl.
USPC .......................................... 713/171; 380/285

(58) Field of Classification Search
None
See application file for complete search history.

(56) References Cited

U.S. PATENT DOCUMENTS

| 7,443,985 | B2 | 10/2008 | Krishnaswamy et al. |
| 8,135,954 | B2 | 3/2012 | Voss et al. |
| 8,307,208 | B2 | 11/2012 | Matsuo |
| 2008/0046731 | A1 | 2/2008 | Wu et al. |
| 2009/0103726 | A1 | 4/2009 | Ahmed et al. |
| 2009/0106551 | A1* | 4/2009 | Boren et al. ................... 713/158 |
| 2010/0131756 | A1 | 5/2010 | Schneider et al. |
| 2010/0197326 | A1 | 8/2010 | Ngo et al. |
| 2010/0217979 | A1* | 8/2010 | Yaghmour ..................... 713/168 |
| 2012/0023336 | A1 | 1/2012 | Natarajan |
| 2012/0079585 | A1* | 3/2012 | Chan et al. ...................... 726/10 |
| 2012/0101951 | A1 | 4/2012 | Li et al. |
| 2012/0131661 | A1 | 5/2012 | Novak et al. |
| 2012/0155647 | A1 | 6/2012 | Zhang et al. |
| 2012/0159150 | A1* | 6/2012 | Brown et al. .................. 713/151 |
| 2012/0170740 | A1 | 7/2012 | Lee et al. |
| 2013/0007456 | A1 | 1/2013 | Dean et al. |
| 2013/0124866 | A1 | 5/2013 | Farrugia et al. |

FOREIGN PATENT DOCUMENTS

WO WO 2009/133544 A1 11/2009

OTHER PUBLICATIONS

IP.Com et al., "Auto-Generation of Encrypted Key at Both the Client Side and the Server Side," IP.Com Prior Art Database IPCOM000205360D, Mar. 28, 2011, pp. 1-3.
Abusukhon, A. et al., "A Novel Network Security Algorithm Based on Private Key Encryption," Conference on Cyber Security Cyber Warfare and Digital Forensic (Cybersec), 2012 International, Jun. 26-28, 2012, pp. 33-37.
Smith, et al, "Secure Mobile Communication Via Identity-Based Cryptography and Server-Aided Computations," Journal of Supercomputing, Aug. 31, 2009, pp. 1-20.

* cited by examiner

*Primary Examiner* — Gilberto Barron, Jr.
*Assistant Examiner* — Malcolm Cribbs
(74) *Attorney, Agent, or Firm* — John M. Harrington, Esq.; Johnson, Marcou & Isaacs, LLC

(57) ABSTRACT

Methods and systems for secure electronic communication involve, for example, using a processor coupled to memory to receive a request message from a user's communication device processor including a session key encrypted with a public key of a public/private key pair without sending a private key of the public/private key pair to, or storing the private key on, the user's communication device. Using the processor, the request message is decrypted with a private key of the public/private key pair and the session key is retrieved from the decrypted request message. Thereafter, also using the processor, a response message is generated and encrypted with the retrieved session key and sent to the user's communication device processor.

13 Claims, 4 Drawing Sheets

METHODS AND SYSTEMS FOR SECURE ELECTRONIC COMMUNICATION

FIELD OF THE INVENTION

The present invention relates generally to the field of electronic communication, and more particularly to methods and systems for secure electronic communication, such as secure electronic communication between a user's mobile device and a backend server.

BACKGROUND OF THE INVENTION

Typically, when a client application, for example, on a mobile device processor, sends a communication to a processor of a backend server, the client application may sign the communication with its Public Key Infrastructure (PKI) private encryption key. The communication may then travel from the client application to the processor of the backend server encrypted with the private key of the client application. The purpose of the private key, which may be presumed to be known only to the client application, is to enable the backend server to confirm that the communication actually came from the client application and not from an unauthorized party. Currently, the private key of the client application may be vulnerable to compromise, for example, where it is stored on the client device, as well as in the transmission to the backend server.

The commonly-used Secure Sockets Layer (SSL) security protocol is not sufficiently secure for securing authentication credentials, such as a user's password and/or a device fingerprint, between a mobile client application and a backend serve, because of the possibility of compromise. There is presently no known solution that can provide payload encryption, non-repudiation and an integrity check for messages exchanged between mobile applications and backend systems without storing private keys in the mobile application on a device, such as a mobile phone, which makes the private key vulnerable to compromise.

There is a current need for methods and systems for secure electronic communication that secure all sensitive information including authentication credentials, such as user passwords and device fingerprints, by assuring that all communications between a mobile device application and a processor of a backend server are payload encrypted.

SUMMARY OF THE INVENTION

Embodiments of the invention employ computer hardware and software, including, without limitation, one or more processors coupled to memory and non-transitory, computer-readable storage media with one or more executable computer application programs stored thereon which instruct the processors to perform the methods and systems for secure electronic communication described herein. Such methods and systems that may involve, for example, receiving, using a server processor coupled to memory, a request message from a user's communication device processor consisting at least in part of a session key encrypted with a public key of a public/private key pair without sending a private key of the public/private key pair to, or storing the private key on, the user's communication device; decrypting, using the server processor, the request message with a private key of the public/private key pair and retrieving the decrypted session key from the decrypted request message; generating, using the server processor, a response message and encrypting the response message with the retrieved session key; and sending, using the server processor, the session key-encrypted response message to the user's communication device processor.

In aspects of embodiments of the invention, receiving the request message may involve, for example, receiving the request message from the user's communication device processor consisting at least in part of the session key and user authentication credentials encrypted with the public key of the public/private key pair. In other aspects, receiving the request message may involve, for example receiving the request message from the user's communication device processor consisting at least in part of the session key and a user password encrypted with the public key of the public/private key pair. In further aspects, receiving the request message may involve, for example, receiving the request message consisting at least in part of the session key appended with the user password and encrypted with the public key of the public/private key pair.

In further aspects of embodiments of the invention, receiving the request message consisting at least in part of the session key encrypted with the public key may involve, for example, receiving the request message consisting at least in part of the session key generated by a client application on the user's communication device processor and encrypted with the public key of the public/private key pair. In still further aspects, receiving the request message consisting at least in part of the session key generated by the client application and encrypted with the public key of the public/private key pair may involve, for example, receiving the request message consisting at least in part of the session key generated by the client application on the user's communication device processor and encrypted with the public key of the public/private key pair of the server.

In other aspects of embodiments of the invention, receiving the request message consisting at least in part of the session key generated by the client application and encrypted with the public key of the public/private key pair may involve, for example, receiving the request message consisting at least in part of the session key generated by the client application on the user's communication device processor and encrypted with the public key of the public/private key pair of the client application. In additional aspects, receiving the request message consisting at least in part of the session key generated by the client application and encrypted with the public key of the public/private key pair of the client application may involve, for example, generating and storing a public/private key pair of the client application by the server processor without sending the client application private key of the generated public/private key pair to the user's communication device.

In additional aspects of embodiments of the invention, receiving the request message consisting at least in part of the session key generated by the client application and encrypted with the public key of the public/private key pair may involve, for example, receiving the request message consisting at least in part of a session-specific random number generated by the client application on the user's communication device processor and encrypted with the public key of the public/private key. In further aspects, receiving the request message consisting at least in part of the session-specific random number generated by the client application on the user's communication device processor and encrypted with the public key of the public/private key pair may involve, for example, receiving the request message consisting at least in part of a 128-bit session-specific random number generated by the client application on the user's communication device processor and encrypted with the public key of the public/private key pair. In other aspects receiving the request message, may involve, for example, receiving the request message from the user's communication device processor consisting at least in part of a session key and a login request encrypted with the public key of a public/private key pair.

In other aspects of embodiments of the invention, decrypting the request message with the private key may involve, for example, decrypting the request message with the private key of the public/private key pair of the server. In additional aspects, decrypting the request message with the private key of the public/private key pair of the server may involve, for example, generating a client application public/private key pair and storing the a client application public/private key pair without sending a client application private key to, or storing the client application private key on, the user's communication device. In further aspects, storing the a user's public/private key pair may involve, for example, storing the client application public/private key pair on a hardware security module without sending the client application private key of the public/private key pair to, or storing the client application private key on, the user's communication device.

In still other aspects of embodiments of the invention, decrypting the request message with the private key of public/private key pair may involve, for example, decrypting the request message with the private key of a public/private key pair of a client application on the user's communication device processor. In still further aspects, retrieving the decrypted session key from the decrypted request message may involve, for example, retrieving the decrypted session key that was generated by a client application on the user's communication device processor and encrypted with the public key of the public/private key pair. In further aspects, generating and encrypting the response message may involve, for example, generating a log-in response message and encrypting the log-in response message with the retrieved session key. In additional aspects, sending the session key-encrypted response message may involve, for example, sending the session key-encrypted response message to a client application on the processor of the user's communication device encrypted with the session key generated and stored by the client application in volatile memory on the user's communication device.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention utilize one or more special purpose computer software application program processes, each of which is tangibly embodied in a physical storage device executable on one or more physical computer hardware machines, and each of which is executing on one or more of the physical computer hardware machines (each, a "computer program software application process"). Physical computer hardware machines employed in embodiments of the invention comprise, for example, input/output devices, motherboards, processors, logic circuits, memory, data storage, hard drives, network connections, monitors, and power supplies. Such physical computer hardware machines include, for example, user machines and server machines that may be coupled to one another via a network, such as a local area network, a wide area network, or a global network through telecommunications channels which may include wired or wireless devices and systems.

Embodiments of the invention provide methods and systems for secure electronic communication that protect communications originating, for example, from mobile applications running on users' communication devices, such as users' mobile devices, that are sent to processors of backend servers and provide confidentiality, non-repudiation and integrity checks for such communications without storing a private key locally in the mobile applications on the mobile devices.

Figure 1:
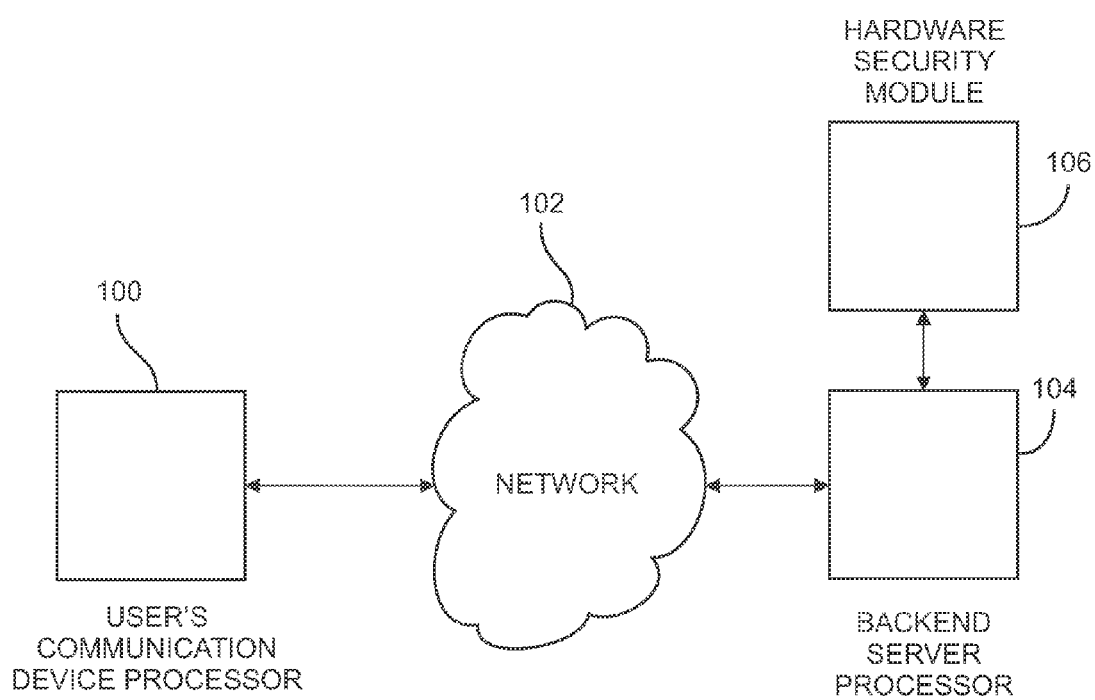
FIG. 1 is a schematic diagram that illustrates an overview example of key components and the flow of information between key components for embodiments of the invention.

FIG. 1 is a schematic diagram that illustrates an overview example of key components and the flow of information between key components for embodiments of the invention. Referring to FIG. 1, key components for embodiments of the invention may include, without limitation, a user's communication device processor 100 coupled over a network 102 to a server processor 104. The user's communication device processor 100 may include, without limitation, the processor of any type of wired or wireless communication device that enables communication electronically.

Referring further to FIG. 1, the network 102 may include, without limitation, any type of wired or wireless network. The server processor 104 may include, without limitation, the processor of any type of computing device that interfaces with the user's communication device processor 100. The hardware security module 106 coupled to the server processor 104 may include, without limitation, a physical computing device for securely storing digital keys for strong authentication.

In embodiments of the invention, a communication between the client application on the user's communication device processor 100 and the processor of a backend server 104 is not, for example, automatically initiated by the client application using the stored private key of the client application, as is done in the current process. Instead, the user may first enter a user name and password on the client application, which may be referred to as an integrity check. When the user name and password are verified by the client application, the client application may generate a random number that is session-specific. In other words, a new random number may be generated every time there is a new session between the client application on the user's communication device processor 100 and the server processor 104.

In embodiments of the invention, the client application-generated random number may be encrypted with a public key, such as the public key of the client application on the user's communication device 100, and sent, along with the communication from the client application, to the backend server processor 104. Using the private key of the client application, which was previously stored by the backend server 104, the backend server 104 may decrypt the communication and confirm that the communication was received from the client application on the user's communication device 100.

Thus, in embodiments of the invention, the private key of the client application need not be stored on the client device or transmitted with the communication from the client application to the backend server 104 as would have been done in a standard PKI process. Therefore, an unauthorized party who attempts to steal the private key of the client application, for example, by breaching the client device 100 or by intercepting the encrypted communication is unsuccessful. Further, a possible breach of security caused by key compromise in local secure storage, such as a secure element of a mobile device, is thereby minimized or eliminated.

Embodiments of the invention may involve, for example, packaging a mobile application with a public key of an entity, such as a financial institution or other business entity. Thereafter, the mobile application may be downloaded to a user's mobile device processor 100, for example, from an app store or from a private hosting site or an entity website or from any other suitable source. In addition, a unique private/public key pair for each mobile user may be generated in advance and stored by the entity's backend server 104. Likewise, a hash value of the mobile application binaries may likewise be generated in advance and similarly stored by the backend server 104.

In embodiments of the invention, the unique private key for each mobile user, together with the hash of the user's mobile application and the user's personal identification number (PIN) and password may be securely stored in the backend system 104 in advance. Further, the mobile application 100 may be capable of generating a hash value of its binaries at the mobile application 100 at run time. The corresponding hash value of the mobile application 100 may also stored in the backend system 104. In addition, the user's mobile application 100 may have the unique public key for the particular user in advance.

Figure 2:
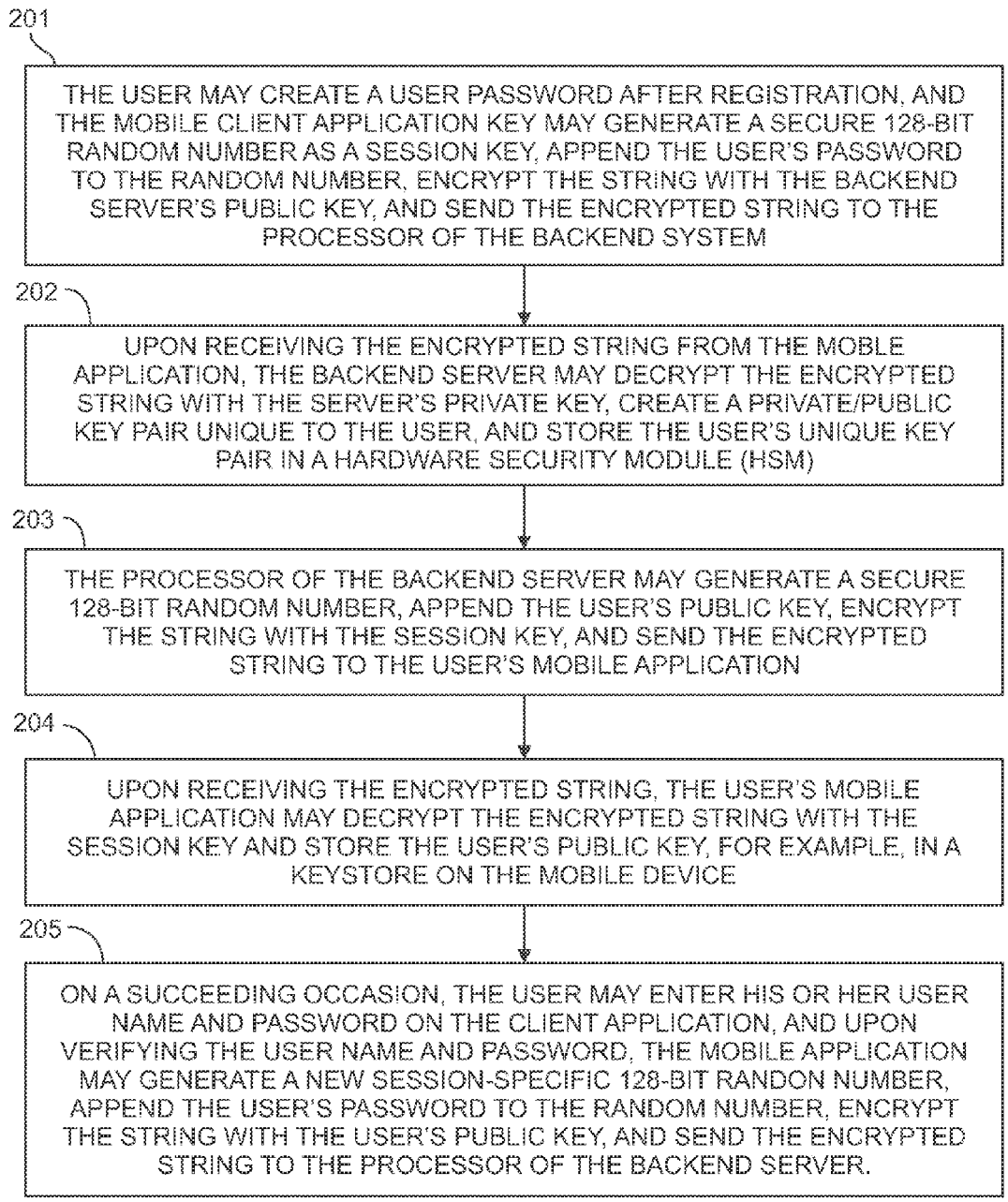
FIG. 2 is a flow diagram that illustrates an example of securely communicating and storing the user's password on the backend server for embodiments of the invention.

FIG. 2 is a flow diagram that illustrates an example of securely communicating and storing the user's password on the backend server 104 for embodiments of the invention. Referring to FIG. 2, at 201, the user may create a user password after registration, and the mobile client application 100 may generate a secure 128-bit random number as a session key. Thereafter, the client application 100 may append the user's password to the random number, encrypt the string with a public key, such as the entity's public key, and send the encrypted string to the processor of the backend server 104.

Referring further to FIG. 2, at 202, upon receiving the encrypted string from the mobile application 100, the processor of the backend server 104 may decrypt the encrypted string with the entity's private key, create a private/public key pair unique to the user, and store the user's unique key pair in the hardware security module (HSM) 106. At 203, the processor of the backend server 104 may generate a secure 128-bit random number, append the user's public key, encrypt the string with the session key, and send the encrypted string to the user's mobile application 100.

At 204, upon receiving the encrypted string, the user's mobile application 100 may decrypt the encrypted string with the session key and store the user's public key, for example, in a keystore on the mobile device. At 205, on a succeeding occasion, the user may enter his or her user name and password on the client application 100. Upon verifying the user name and password, the mobile application 100 may generate a new session key, such as a new session-specific 128-bit random number, append the user's password to the random number, encrypt the string with the user's public key, and send the encrypted string to the processor of the backend server 104.

Figure 3:
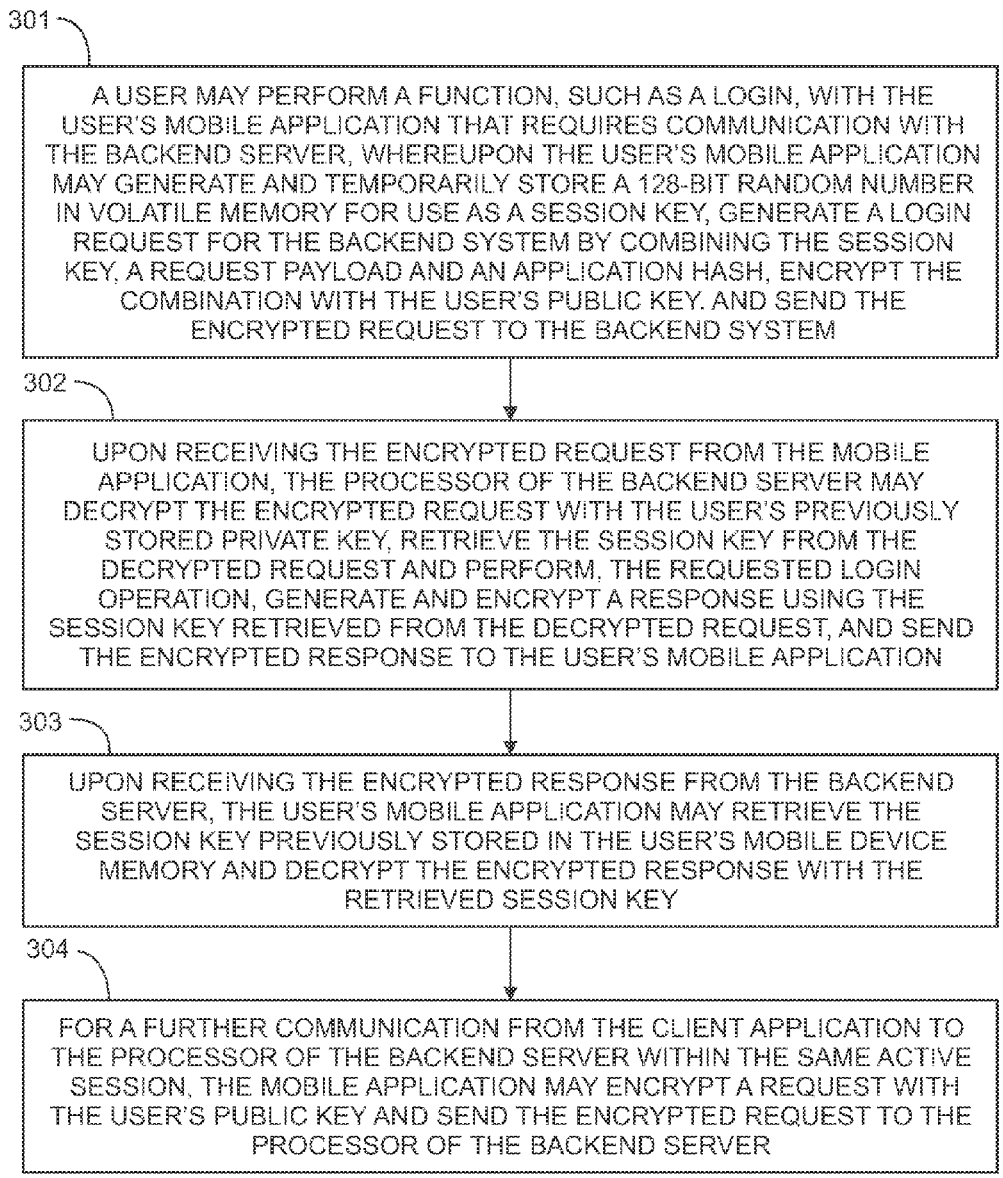
FIG. 3 is flow diagram that illustrates an example of a process of secure communication between a client application processor and a backend server processor for embodiments of the invention.

FIG. 3 is flow diagram that illustrates an example of a process of secure communication between a client application 100 and a backend server processor 104 for embodiments of the invention. Referring to FIG. 3, at 301 a user may perform a function, such as a login, with the user's mobile application 100, such as a mobile wallet, that requires communication with a backend server 104. While the present example is a user login, it is to be understood that the process may be the same or similar for any other secure interaction between a mobile application 100 on the user's mobile device and a backend server 104.

Referring again to FIG. 3, also at 301, the user's mobile application 100 may generate and temporarily store a random number, such as a 128-bit random number, in volatile memory of the user's mobile device. The 128-bit random number may be used as a session key for the succeeding communication between the user's mobile application and the backend system 104. In addition, at 301, the mobile application 100 may create a login request for the backend system 104 by combining the session key plus a request payload plus an application hash, encrypt the combination with the user's public key, and send the encrypted request to the backend system 104.

Referring further to FIG. 3, at 302, upon receiving the encrypted request from the mobile application 100, the processor of the backend server 104 may decrypt the encrypted request with the user's previously stored private key. In addition, the processor of the backend server 104 may retrieve the session key from the decrypted request and perform the requested operation. In the login example, the requested operation may involve authentication of the user's credentials. Thus, the decrypted login request may include, for example, a user's login ID or user name and the user's password.

Referring again to FIG. 3, also at 302, after checking and confirming that the user name and password matches the user name and user password previously stored for the user by the backend server 104, the processor of the backend server 104 may perform the login operation. Thereafter, the processor of the backend server 104 may generate and encrypt a response using the session key retrieved from the decrypted request and send the encrypted response to the user's mobile application 100.

Referring once more to FIG. 3, at 303, upon receiving the encrypted response from the backend server 104, the user's mobile application 100 may retrieve the session key previously stored in the user's mobile device memory and decrypt the encrypted response with the retrieved session key. At 304, for a further communication from the client application to the processor of the backend server 104 within the same active session, the mobile application 100 may encrypt a request with the user's public key and send the encrypted request to the processor of the backend server 104.

Thereafter, for all ongoing communication between mobile application 100 and the processor of the backend server 104 in the same active session, the logic may be similar to the logic employed, for example, at 301 through 303 as shown in FIG. 3, in which a request is encrypted by the mobile application 100 using the user's public key, and the encrypted request is sent by the mobile application 100 to the processor of the backend server 104.

Figure 4:
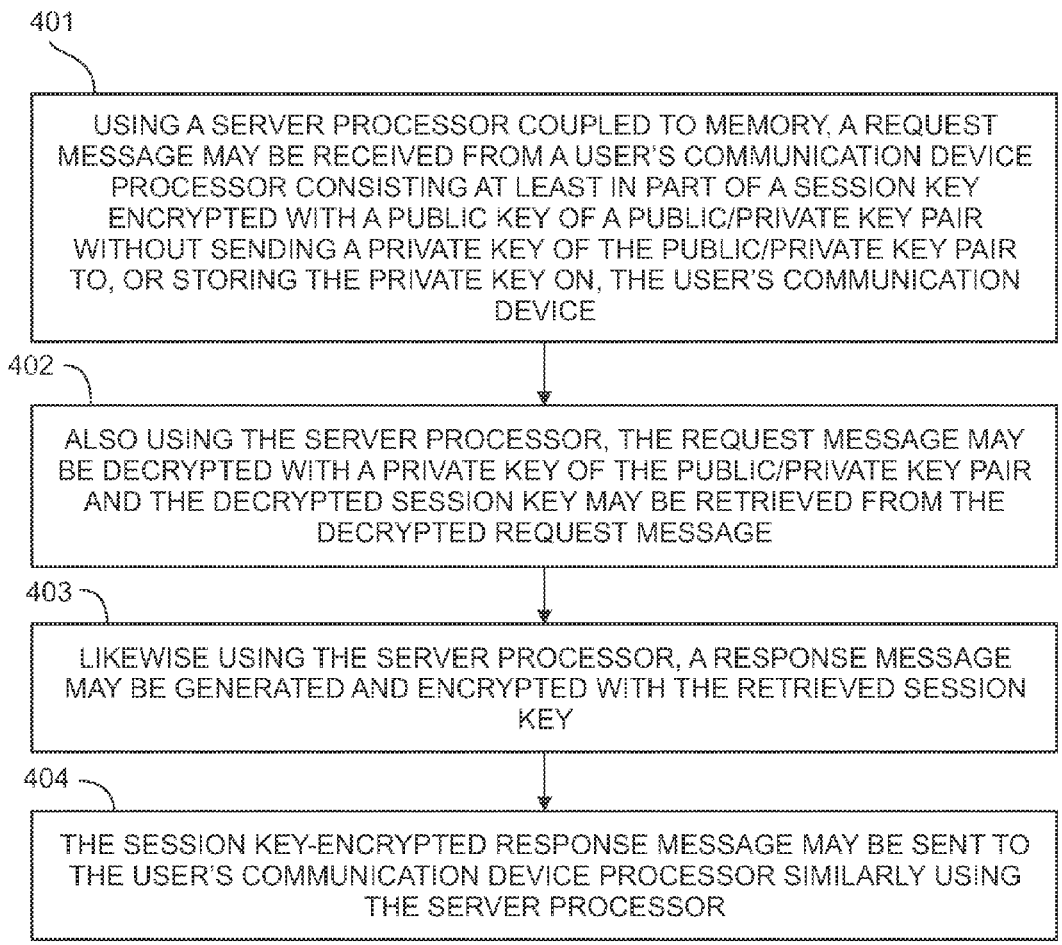
FIG. 4 is a flow chart that illustrates an overview example of secure electronic communication for embodiments of the invention.

FIG. 4 is a flow chart that illustrates an overview example of secure electronic communication for embodiments of the invention. Referring to FIG. 4, at 401, using a server processor 104 coupled to memory, a request message may be received from a user's communication device processor 100 consisting at least in part of a session key encrypted with a public key of a public/private key pair without sending a private key of the public/private key pair to, or storing the private key on, the user's communication device 100.

Referring further to FIG. 4, at 402, also using the server processor 104, the request message may be decrypted with a private key of the public/private key pair and the decrypted session key may be retrieved from the decrypted request message. At 403, likewise using the server processor 104, a response message may be generated and encrypted with the retrieved session key, and at 404, the session key-encrypted response message may be sent to the user's communication device processor 100 similarly using the server processor 104.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a Wide Area Network (WAN), a Local Area Network (LAN), a cellular network, or any other suitable network.

Embodiments of the invention may employ client devices that may each comprise a computer-readable medium, including but not limited to, Random Access Memory (RAM) coupled to a processor. The processor may execute computer-executable program instructions stored in memory. Such processors may include, but are not limited to, a microprocessor, an Application Specific Integrated Circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions.

Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system.

Server devices may also be coupled to the network and, similarly to client devices, such server devices may comprise a processor coupled to a computer-readable medium, such as a RAM. Such server devices, which may be a single computer system, may also be implemented as a network of computer processors. Examples of such server devices are servers, mainframe computers, networked computers, a processor-based device, and similar types of systems and devices.

What is claimed is:

1. A method for secure electronic communication between a client application processor and a server processor, comprising:

generating, using a server processor coupled to memory, a client application public/private key pair and storing the client application public/private key pair on a physical hardware security module without sending a client application private key to, or storing the client application private key on, a user's communication device;

receiving, using the server processor, a request message from a user's communication device processor consisting at least in part of a session key encrypted with the client application public key of the public/private key pair;

retrieving, using the server processor, the client application private key of the public/private key pair stored on the physical hardware security module;

decrypting, using the server processor, the request message with the client application private key of the public/private key pair and retrieving the decrypted session key from the decrypted request message;

generating, using the server processor, a response message and encrypting the response message with the retrieved session key; and sending, using the server processor, the session key-encrypted response message to the user's communication device processor.

2. The method of claim 1, wherein receiving the request message further comprises receiving the request message from the user's communication device processor consisting at least in part of the session key and user authentication credentials encrypted with the client application public key of the public/private key pair.

3. The method of claim 1, wherein receiving the request message further comprises receiving the request message from the user's communication device processor consisting at least in part of the session key and a user password encrypted with the client application public key of the public/private key pair.

4. The method of claim 3, wherein receiving the request message further comprises receiving the request message consisting at least in part of the session key appended with the user password and encrypted with the client application public key of the public/private key pair.

5. The method of claim 1, wherein receiving the request message consisting at least in part of the session key encrypted with the client application public key further comprises receiving the request message consisting at least in part of the session key generated by a client application on the user's communication device processor and encrypted with the client application public key of the public/private key pair.

6. The method of claim 1, wherein receiving the request message consisting at least in part of the session key generated by the client application and encrypted with the client application public key of the public/private key pair further comprises receiving the request message consisting at least in part of a session-specific random number generated by the client application on the user's communication device processor and encrypted with the client application public key of the public/private key.

7. The method of claim 6, wherein receiving the request message consisting at least in part of the session-specific random number generated by the client application on the user's communication device processor and encrypted with the client application public key of the public/private key pair further comprises receiving the request message consisting at least in part of a 128-bit session-specific random number generated by the client application on the user's communication device processor and encrypted with the client application public key of the public/private key pair.

8. The method of claim 1, wherein receiving the request message further comprises receiving the request message from the user's communication device processor consisting at least in part of a session key and a login request encrypted with the client application public key of the public/private key pair.

9. The method of claim 1, wherein retrieving the decrypted session key from the decrypted request message further comprises retrieving the decrypted session key that was generated by a client application on the user's communication device processor and encrypted with the client application public key of the public/private key pair.

10. The method of claim 1, wherein generating and encrypting the response message further comprise generating a log-in response message and encrypting the log-in response message with the retrieved session key.

11. The method of claim 1, wherein sending the session key-encrypted response message further comprises sending the session key-encrypted response message to a client application on the processor of the user's communication device encrypted with the session key generated and stored by the client application in volatile memory on the user's communication device.

12. A machine for secure electronic communication, comprising:
a server processor coupled to memory, the server processor being programmed for:
generating a client application public/private key pair and storing the client application public/private key pair on a physical hardware security module without sending a client application private key to, or storing the client application private key on, a user's communication device;
receiving a request message from a user's communication device processor consisting at least in part of a session key encrypted with the client application public key of the public/private key pair;
retrieving, using the server processor, the client application private key of the public/private key pair stored on the physical hardware security module;
decrypting the request message with the client application private key of the public/private key pair and retrieving the decrypted session key from the decrypted request message;
generating a response message and encrypting the response message with the retrieved session key; and
sending the session key-encrypted response message to the processor of the user's communication device.

13. A non-transitory computer-readable storage medium with an executable program stored thereon, wherein the program instructs a server processor to perform the following steps:
generate a client application public/private key pair and storing the client application public/private key pair on a physical hardware security module without sending a client application private key to, or storing the client application private key on, a user's communication device;
receive a request message from a user's communication device processor consisting at least in part of a session key encrypted with the client application public key of the public/private key pair;
retrieve the client application private key of the public/private key pair stored on the physical hardware security module;
decrypt the request message with the client application private key of the public/private key pair and retrieve the decrypted session key from the decrypted request message;
generate a response message and encrypt the response message with the retrieved session key; and
send the session key-encrypted response message to the processor of the user's communication device.

* * * * *